(12) United States Patent
Shahraray

(10) Patent No.: US 6,211,912 B1
(45) Date of Patent: *Apr. 3, 2001

(54) METHOD FOR DETECTING CAMERA-MOTION INDUCED SCENE CHANGES

(75) Inventor: Behzad Shahraray, Freehold, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/191,234

(22) Filed: Feb. 4, 1994

(51) Int. Cl.⁷ .............................. H04N 9/73; H04N 5/14
(52) U.S. Cl. ...................... 348/228; 348/155; 348/700
(58) Field of Search ................................ 348/228, 154, 348/155, 382, 699, 700

(56) References Cited

U.S. PATENT DOCUMENTS

| | | | | |
|---|---|---|---|---|
| 4,823,184 | * | 4/1989 | Belmares-Sarabia et al. | 348/700 |
| 5,020,890 | * | 6/1991 | Oshima et al. | 348/208 |
| 5,032,905 | * | 7/1991 | Koga | 348/700 |
| 5,099,322 | * | 3/1992 | Gove | 348/700 |
| 5,192,964 | * | 3/1993 | Shinohara et al. | 348/208 |
| 5,210,559 | * | 5/1993 | Ohki | 348/208 |
| 5,267,034 | * | 11/1993 | Miyatake et al. | 348/208 |
| 6,055,025 | * | 4/2000 | Shahrary | 348/700 |

OTHER PUBLICATIONS

Co–pending U.S. patent application Ser. No. 08/171,136, filed Dec. 21, 1993, "Method and Apparatus for Detecting Abrupt and Gradual Scene Changes In Image Sequences".
*The Television Program: Its Direction and Production,* Stasheff, E. and Bretz, R., pp. 53–56 (Chapter 1), 76–87 (Chapter 5) and 248–68 (Chapter 15) Fourth Edition, Hill and Wang Publishers, New York, 1968.
"Automatic Image Stabilizing System by Full Digital Signal Processing", K. Umori et al., *IEEE Transactions on Consumer Electronics,* vol. 36, No. 3, pp. 510–519, Aug. 1990.
"Video Indexing Using Motion Vectors", A. Akutsu et al., Proc. SPIE Conf. Visual Communications and Image Processing (VCIP'92), vol. 1818, pp. 1522–1530.

* cited by examiner

Primary Examiner—Wendy R. Garber
Assistant Examiner—Jacqueline Wilson

(57) ABSTRACT

A method for determining camera-induced scene changes in a sequence of visual information-bearing frames which constitute a single shot first determines camera-induced motion between each of a plurality of pairs frames within a single camera shot. The camera-induced motion for each of the pairs of frames is decomposed into at least a first component. The values of the first component for each of the pairs of frames are summed to form a first cumulative signal. A scene change is indicated when the first cumulative signal meets a certain decision criteria.

22 Claims, 8 Drawing Sheets

METHOD FOR DETECTING CAMERA-MOTION INDUCED SCENE CHANGES

CROSS-REFERENCE TO RELATED APPLICATION

This application is a Continued Prosecution application under 37 CFR § 1.53(d) of applicant's copending application Ser. No. 08/191,234, filed Feb. 4, 1994, which application is pending.

TECHNICAL FIELD

This invention relates to a method for automatically detecting scene changes in image sequences such as video programs, and more particularly to a method for detecting inter-shot scene changes resulting from camera operations such as panning, tilting, and zooming.

BACKGROUND

Video programs are generally formed from a compilation of different video segments which are known as "shots" in the film and video industry. Each shot consists of a sequence of consecutive frames (i.e., images) generated during a continuous (uninterrupted) operating interval from a single camera. For example, in motion pictures, a shot is a continuous series of frames recorded on film that is generated by a single camera from the time it begins recording until is stops.

In live television broadcasts a shot constitutes those images seen on the screen from the time a single camera is broadcast over the air until it is replaced by another camera.

Shots can be joined together either in an abrupt mode (i.e., butt-edit, or switch) in which the boundary between two consecutive shots (known as a "cut") is well-defined, or through one of many other editing modes such as fade or dissolve which result in a gradual transition from one shot to the next. The particular transition mode that is employed is generally chosen by the director to provide clues about changes in time and place which help the viewer follow the progress of events.

There are known automatic video indexing methods which detect abrupt transitions between different shots. An example of such a method, which can detect abrupt as well as gradual transitions, has been disclosed in patent application Ser. No. 08/171,136, filed Dec. 21, 1993, entitled "Method and Apparatus for Detecting Abrupt and Gradual Scene Changes In Image Sequences", the contents of which is hereby incorporated by reference. In the context of automatic video program indexing these abrupt transitions are often referred to as "scenes" and the detected boundaries (i.e., cuts) are referred to as "scene boundaries". A "scene", however, is commonly considered to be a sequence of frames with closely related contents conveying substantially similar information. If video programs consisted only of "still shots" (i.e., shots in which the camera is motionless), each shot would contain only a single scene. However, in general, video programs are composed not only of still shots but also "moving shots" (i.e., shots in which the camera undergoes operations such as pan, tilt and zoom). Consequently, because of camera motion the contents of a series of frames over an individual shot may change considerably, resulting in the existence of more than one scene in a given shot. Therefore, while boundaries between different shots are scene boundaries, such boundaries may be only a subset of all the scene boundaries that occur in a video program since camera motion may produce inter-shot scene changes.

Known scene change detection methods are deficient because they can only detect scene changes that occur at the boundary between shots, not scene changes that occur within an individual shot.

SUMMARY

In accordance with this invention, a method has been developed for determining camera-induced scene changes in a sequence of visual information-bearing frames which constitute a single shot. In one example of this method, camera-induced motion is determined between each of a plurality of pairs frames within a single camera shot. The camera-induced motion for each of the pairs of frames is decomposed into at least a first component. The values of the first component for each of the pairs of frames are summed to form a first cumulative signal. A scene change is indicated when the first cumulative signal meets a certain decision criterion.

In one particular example of the invention, the first component into which the camera motion is decomposed represents either image pan, image tilt, or image zoom. In another example of the invention, the camera motion is decomposed into all three of these components.

In another example of the invention, a signal is generated which represents camera-induced motion between each of a plurality of pairs of frames within a single camera shot. A plurality of the signals are summed for a plurality of pairs of frames to form a first cumulative signal. A scene change is indicated when the first cumulative signal meets a certain decision criterion.

In yet another example of the invention, the method of the invention works in conjunction with a known method such as block matching for detecting abrupt and gradual transitions between camera shots. The known method is used to find the beginning of each camera shot, which is designated as the beginning of a new scene. Any known method may be then employed to extract the image pan, image tilt, and image zoom that occurs between consecutive frames within the shot. For each of the camera operations of image pan, image tilt, and image zoom, the values computed between consecutive frames are used to generate two signals: 1) a continuous signal representing the cumulative value of the camera operation since the beginning of the new scene; and 2) a binary signal indicating continuous activation of the camera for the given operation. A scene change is indicated whenever: 1) the magnitude of the cumulative value for any of the operations exceeds a predetermined threshold; or 2) a continuous operation period for any of the operations (i.e., pan, tilt, or zoom) terminates (as indicated by the binary signal) and the corresponding cumulative value has a magnitude at least as large as another predetermined threshold.

DETAILED DESCRIPTION

Figure 1:
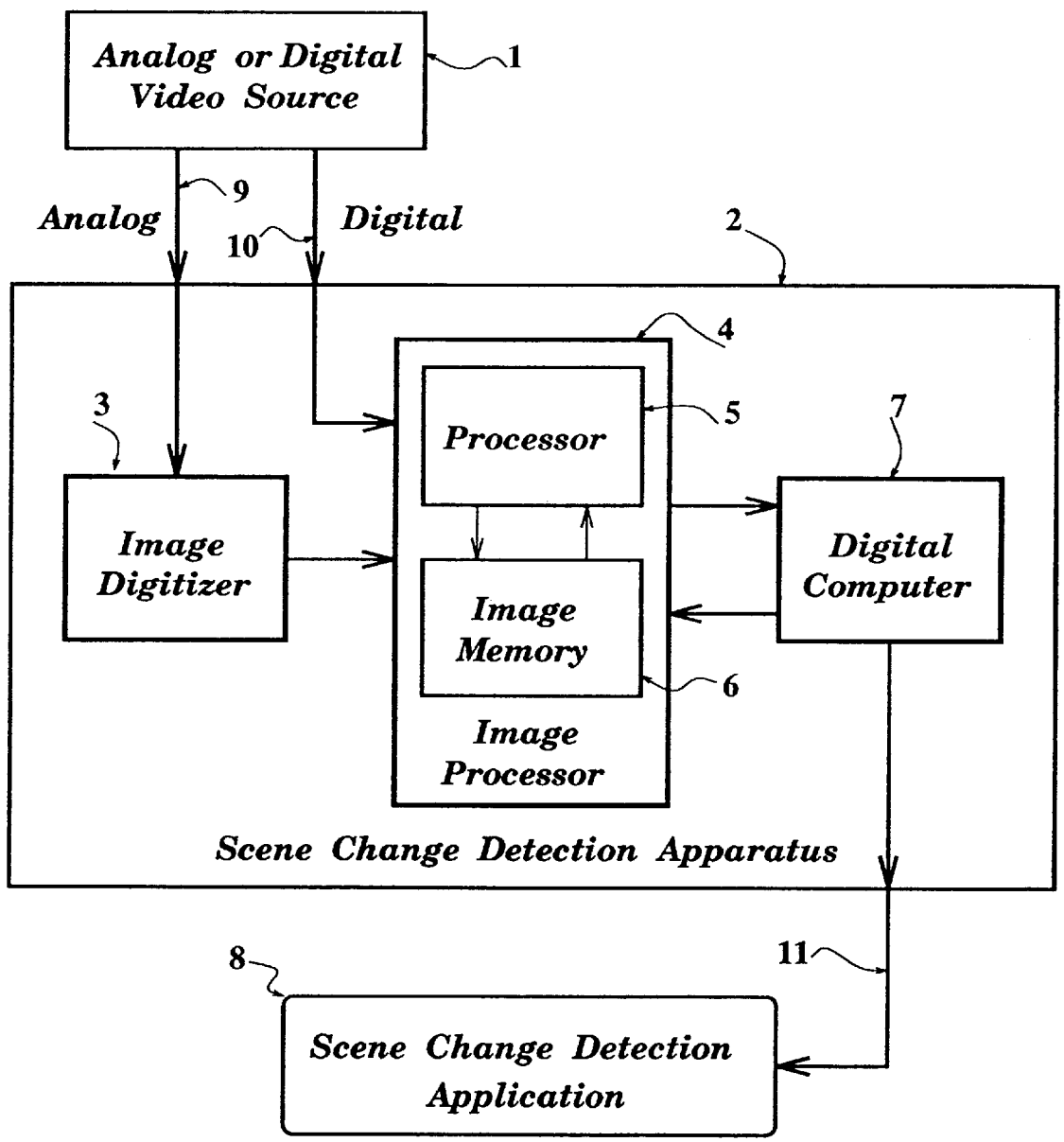
FIG. 1 is a block diagram of an example of a camera-induced scene change detector, including a video source an application interface, in accordance with this invention.

FIG. 1 shows a block diagram of the scene change detector 2 in accordance with one example of this invention. The detector 2 includes an image digitizer 3, an image processor 4, and a digital computer 7. The image processor 4 includes an image memory 6 for holding digitized images of current and previous frames and for storing intermediate results produced by the image processor 4. The image processor 4 also includes a processor 5 to process the images contained in the image memory 6. In an alternative example of the invention, the digital computer 7 performs the tasks of image processor 4, thus eliminating the need for a separate image processor 4. As described below, the scene change detector 2 can detect both boundaries between shots, as well as inter-shot scene boundaries.

Figure 2:
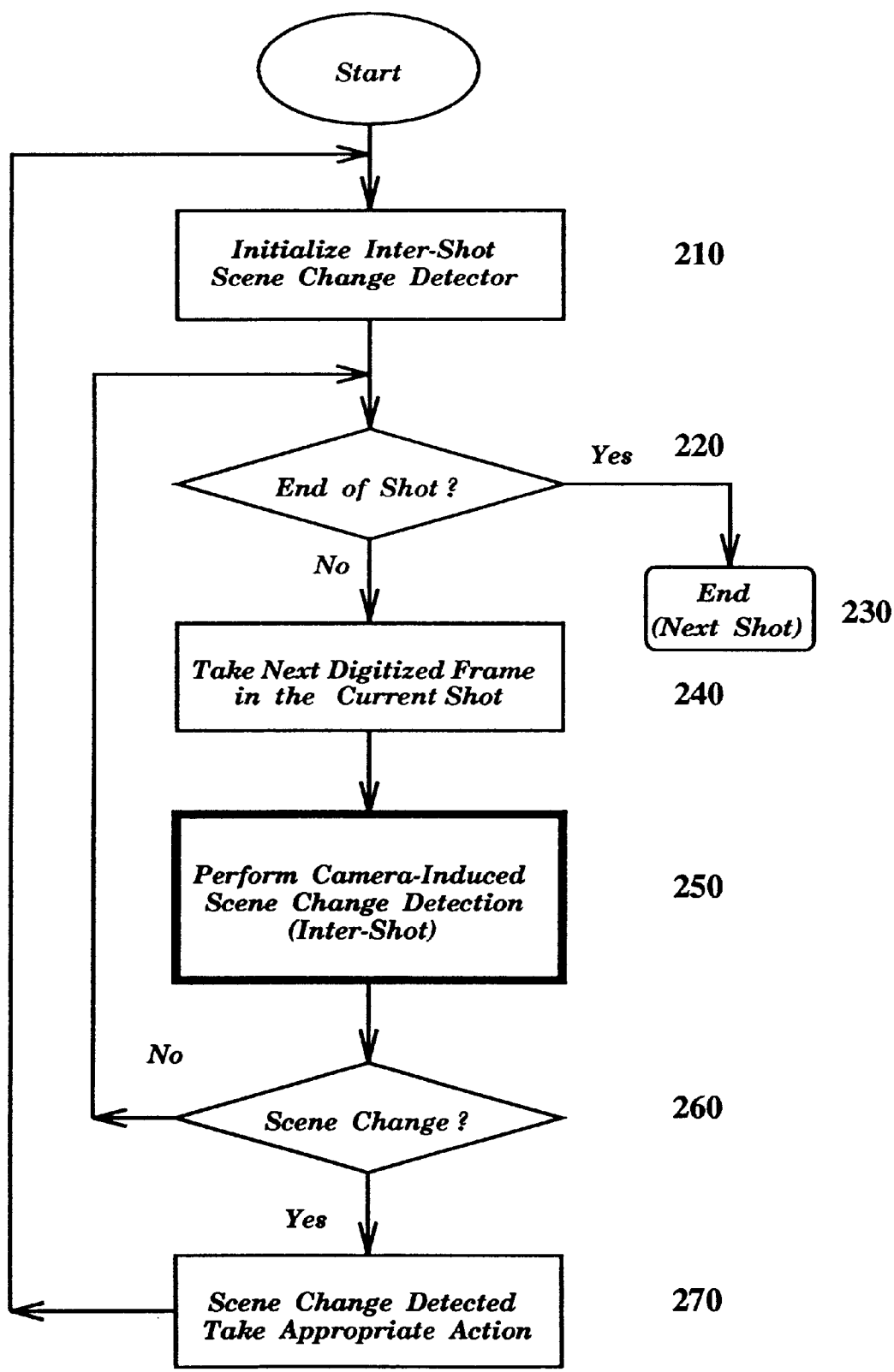
FIG. 2 is a flowchart illustrating an example of the method of this invention operating on a single shot.

The method of the invention operates on individual shots within a video program. However, before such inter-shot scene changes can be detected, the video program must be first segmented into individual shots by any known method. Once the individual shots have been delineated, the inter-shot scene changes within each shot can be detected by the method of this invention, as shown in FIG. 2. It should be noted that a shot boundary is itself a scene change.

The steps performed by one example of this invention are shown in FIG. 2. At the beginning of a shot (which is also the beginning of a new scene) the camera-induced scene change detector is initialized in step 210. Consecutive frames within the shot are digitized in step 240, and the camera-induced scene change detection method is employed to detect inter-shot scene changes in step 250. The output from step 250 is checked in step 260 for the presence of a scene change. If a scene change has been detected, appropriate action is taken in step 270. The particular action taken is a function of the application for which scene change detection is used. The method of the invention may be used in connection with any desired application, a few examples of which will be set forth below. The inter-shot scene change detector is then initialized to repeat the process. The above-described steps are repeated until all the frames within the shot have been operated on. In the event that no scene change has been detected, the process continues without reinitialization of the inter-shot scene change detector.

Figure 3:
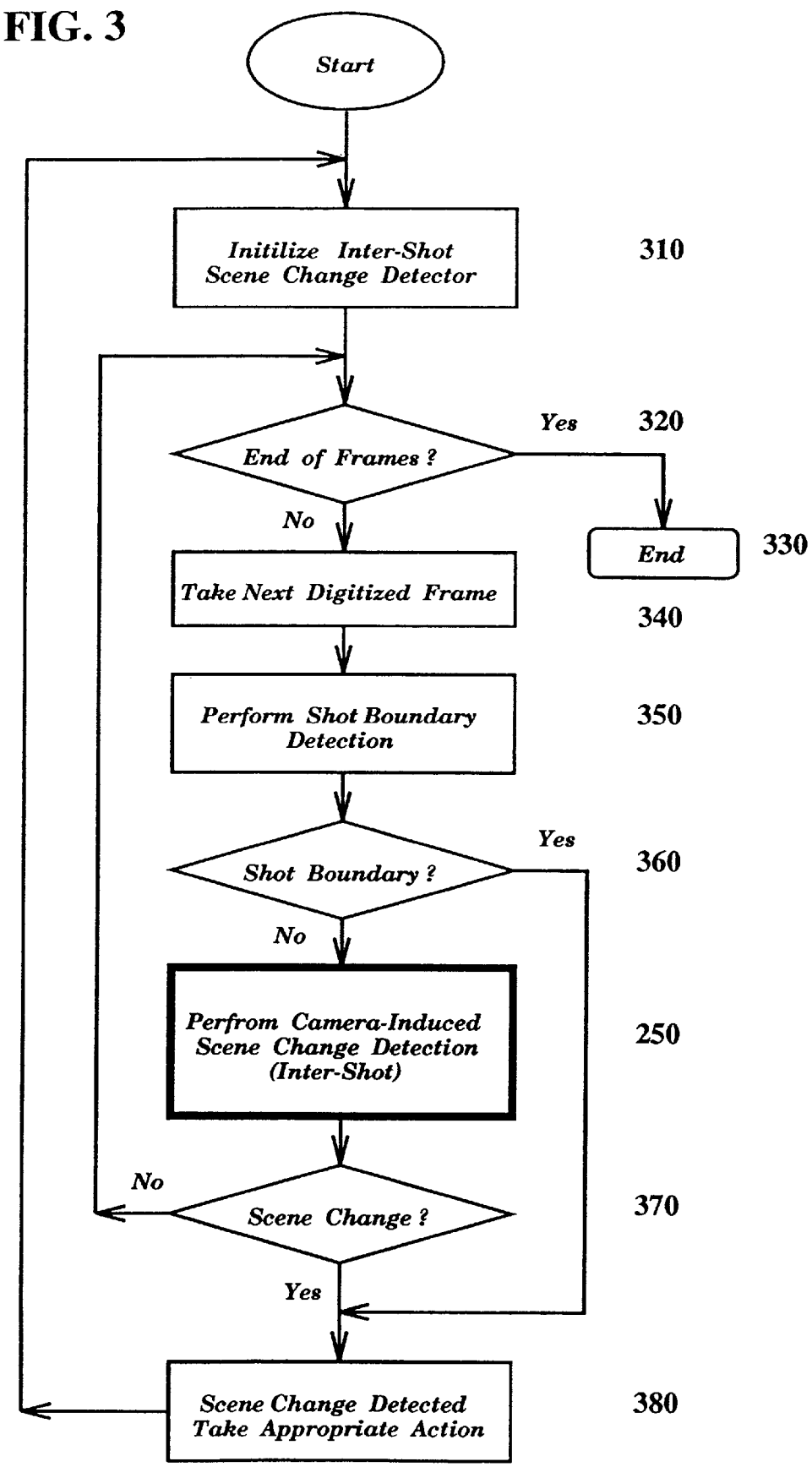
FIG. 3 is a flowchart illustrating an example of this invention operating in conjunction with a shot boundary detector to detect scene changes at shot boundaries and inter-shot locations.

In another example of the invention, the detection of shot boundaries and inter-shot scene changes are both performed on the video program together, as shown in FIG. 3. In this case the initialization step 310 is performed initially as well as after the detection of each scene change. The frames are digitized consecutively in step 340. The digitized frames are first checked for the existence of a shot boundary in step 350 by using a known shot boundary detection method such as the method disclosed above. The result is checked in step 360. If a shot boundary (which is also a scene boundary) is detected, step 380 is performed, and the process is repeated beginning with step 310. If a shot boundary has not been detected, step 250 is performed to detect any inter-shot scene changes. The result of this step is checked in step 370. If an inter-shot scene change is detected, step 380 is performed and the process is repeated beginning with step 310. If an inter-shot scene change is not detected, the process is repeated beginning with step 320, thus avoiding the reinitialization of the inter-shot detector. The process is terminated at step 330 when step 320 indicates that the last program frame has been reached.

The inter-shot scene change detection method performed in step 250 will be described in detail below. Since the detection criteria used in step 250 rely on camera operations, examples of different camera operations and the purpose for employing them will be discussed first. The effects of these camera operations on the frames, and the detection criteria used to recognize these effects, will be presented subsequently.

Camera Operations

Video programs are generally composed of two different types of shots. One type of shot results when the camera does not move and the lens does not zoom in or out. This type of shot is known as a "still shot". The other type of shot results when the camera either moves, undergoes a zoom, or does both simultaneously. These shots are known as "moving shots". Camera motion and zoom are collectively referred to as "camera operations" or "camera motions".

Camera operations can be classified as follows. A "pan" is a horizontal rotation of the camera (i.e., about a vertical axis) to the left or right. A "tilt" is a vertical rotation of the camera (i.e., about a horizontal axis) up or down. "Dollying" is camera motion along the camera's optical axis either toward or away from the object. "Tracking", as used herein, refers to the motion of the camera within a plane perpendicular to its optical axis. Of course, any translational motion of the camera is a combination of both dollying and tracking. "Zooming" is the effect created by varying the focal length of a zoom lens which is very similar to the effect created by dollying. Each of the above camera operations may be considered a component of the actual motion that the camera undergoes.

Purpose of Camera Operations

Typically, a camera is not moved while imaging unless there is clear purpose. In a well-directed video program, every camera operation is performed for a good reason. For example, a pan or tilt motion may be used to "follow the action" as the subject moves from one side of the image to another. Pan or tilt may also be used for "association" to bridge the view between two different subjects by panning and/or tilting from one subject to another. Pan and tilt are also used for "orientation" to show a large subject that cannot fit within one frame (possibly even in the fully zoomed out position) and thus the camera moves to record the entire subject over several frames. Similar to "orientation", pan and tilt may be used for "exploration", in which selected details of a scene are shown in a closeup view. Examples of association, orientation, and explorations are disclosed in Stasheff E., and Bretz R., "The Television Program: Its Direction and Production," fourth edition, Hill and Wang publishers, New York, 1968.

Tracking may be used to achieve results very similar to (but not exactly the same as) pan and tilt. Tracking may be used to view a subject from a full 360°. A property of tracking which is not shared by the rotational motions of pan and tilt is an increased sense of depth. This occurs because when the camera tracks, objects that are closer to the camera appear to move faster than those which are farther away.

Zooming serves several purposes. A zoom-in operation generates a closeup view of a subject to provide details that cannot be seen in a wider field of view. A shot may begin with the zoom lens in a wide angle position, generating a small view of the subject or several subjects, then zoom-in to obtain a magnified view of one particular subject while excluding other subjects. A slow zoom operation involving a significant magnification change causes a continuous increase or decrease in the magnification of the objects and hence, the observable detail, while additionally supplying information regarding the relative position of the subjects in the scene. A zoom-out operation may be used to present a view of the subject's surroundings or to include other subjects in the scene.

Zooming and dollying both change the field of view and the magnification. While the degree of magnification produced by dollying depends on the distance between the camera and the object, the degree of magnification produced by zooming is independent of the distance and is only a function of the change in the focal length of the lens.

Effects of Camera Operations on the Image

Each of the camera operations discussed above has a unique effect on the frames generated by the camera. While for purpose of this discussion only the motion of the camera is considered, the total motion is a composite of both the camera motion and the object motion. The methods used to extract the camera motion are capable of distinguishing between camera motion and object motion.

A camera pan operation causes a horizontal shift in the image. All the stationary objects (and the background) move by the same amount regardless of their relative positions with respect to the camera. This horizontal shift of the image will be referred to as "image pan". As a result of image pan, a portion of the contents of the image exits to the left or right and new contents enters from the right or left, respectively.

A camera tilt operation causes a vertical shift in the image. As in the case of pan, all the stationary objects move by the same amount. This shift of the image is referred to as "image tilt". As a result of image tilt, a portion of the image exits to the top or bottom and new image enters from the bottom or top, respectively.

A camera tracking operation along a horizontal line causes the objects in the image to shift horizontally. Unlike a camera pan, however, the objects closer to the camera shift more than those that are farther from the camera. The variation in the shift of the objects is small if the variation in distance from the objects to the camera is small. For the purposes of this invention, horizontal tracking is treated the same as camera pan and their effects on the image will be collectively referred to as "image pan". Similarly, a camera tracking operation along a vertical line results in an "image tilt". A camera tracking operation along a diagonal line (or a curve) results in both image pan and image tilt.

A camera zoom operation causes a change in the magnification of the object in the image. When zooming-in, the magnification increases. This is accompanied by an apparent radial motion of the objects away from the image center, with possibly some of the objects appearing to exit the image. A zoom-out causes an effect opposite to that of zoom-in and can cause new objects to appear in the image. The change in the magnification of objects resulting from camera zoom or camera dolly is referred to as "image zoom".

Detection Criteria

The criteria for detecting camera-motion-induced scene changes are based on the goals that the camera motions are intended to achieve and their effects on the image. For the purposes of this invention, camera motions are divided into two different categories as set forth below based on the goals they are to achieve.

The first category of camera motions consists of those camera operations in which only the end result is significant. For example, pan and/or tilt, or tracking are often employed to follow the movement of an object, and thus when the object stops moving the camera stops moving. In this case, only the end result of the camera motion is important. Another example occurs when pan or tilt is used for "association". In this case the camera motion plays a role similar to that of a gradual transition (e.g., dissolve) between two adjacent shots, and the end of the camera operation is the beginning of a new scene. Yet another example occurs when a zoom-in operation is used to achieve a close-up view of an object (e.g., a hotel-room door) that initially appears in the scene, so as to make a detail (e.g., the room number) observable.

The second category of camera motions consists of those operations in which changes in the visual contents of the image that occur while the camera operation is in progress are significant. These camera motions include large pan and tilt movements for "orientation" or "exploration" purposes as defined above. This category also includes slow zooms in which there is a significant change in magnification. While in these cases the contents of neighboring frames are very similar, frames that are farther apart may differ considerably in content because a large pan, tilt, or zoom can exclude objects from the field of view of the camera which were initially present and introduce new objects that were not initially present. Such a contextual change may occur many times during a single shot, and may even occur several times during one continuous camera operation.

It should be noted that the two categories of camera motions discussed above are not mutually exclusive. That is, camera operations are sometimes employed in which the changes in frame content are significant during the camera motion, as well as at the end of the camera motion. Hence, with the two categories of camera motions set forth above, the criteria for detecting camera-motion induced scene changes within a shot are as follows.

Scene changes which are produced by the first category of camera motion are detected in the following way. For each of the operations of image pan, image tilt, and image zoom, time intervals (as measured in frames) are found over which the operation is continuously active. A scene change is detected if two criteria are met: 1) the active interval has terminated (i.e., the camera motion has stopped), and 2) the cumulative result of the given operation since the beginning of the current scene has reached or exceeded a predetermined threshold. The first criterion detects the end of a camera operation. The second criterion is imposed to prevent a scene change from being generated when a camera operation occurs whose net result is not sufficiently significant to justify a scene change. An example of such an insignificant operation occurs when the camera repeatedly pans to the left and right either as a result of jitter or to compensate for small lateral motions of the object. When this camera operation ends, the net amount of image pan is small and thus will not generate a scene change.

Scene changes which are produced by the second category of camera motion are detected as follows. For each of the operations of image pan, image tilt, and image zoom, the cumulative result of the given operation since the beginning of the current scene is compared against a predetermined threshold (which is likely to be different for each different operation). A scene change is indicated if the cumulative result for that operation reaches or exceeds its respective predetermined threshold. Unlike the first category above, in this case a scene change may be generated while the operation is still in progress. The predetermined thresholds employed for the second category of camera motions are typically considerably larger than those used for the first category. These thresholds determine how much of a change, over the course of a large camera operation (or a series of small operations), is required to introduce new contents into the image. For example, when performing camera pan for the purpose of exploration or orientation, a cumulative image pan value that is approximately equal to the width of the image results in the original contents of the image being shifted out and new contents being shifted in. In this case, if the image pan threshold is chosen to be equal or close to the width of the image, a new scene will be detected at the appropriate point.

Detection Method

Figure 4:
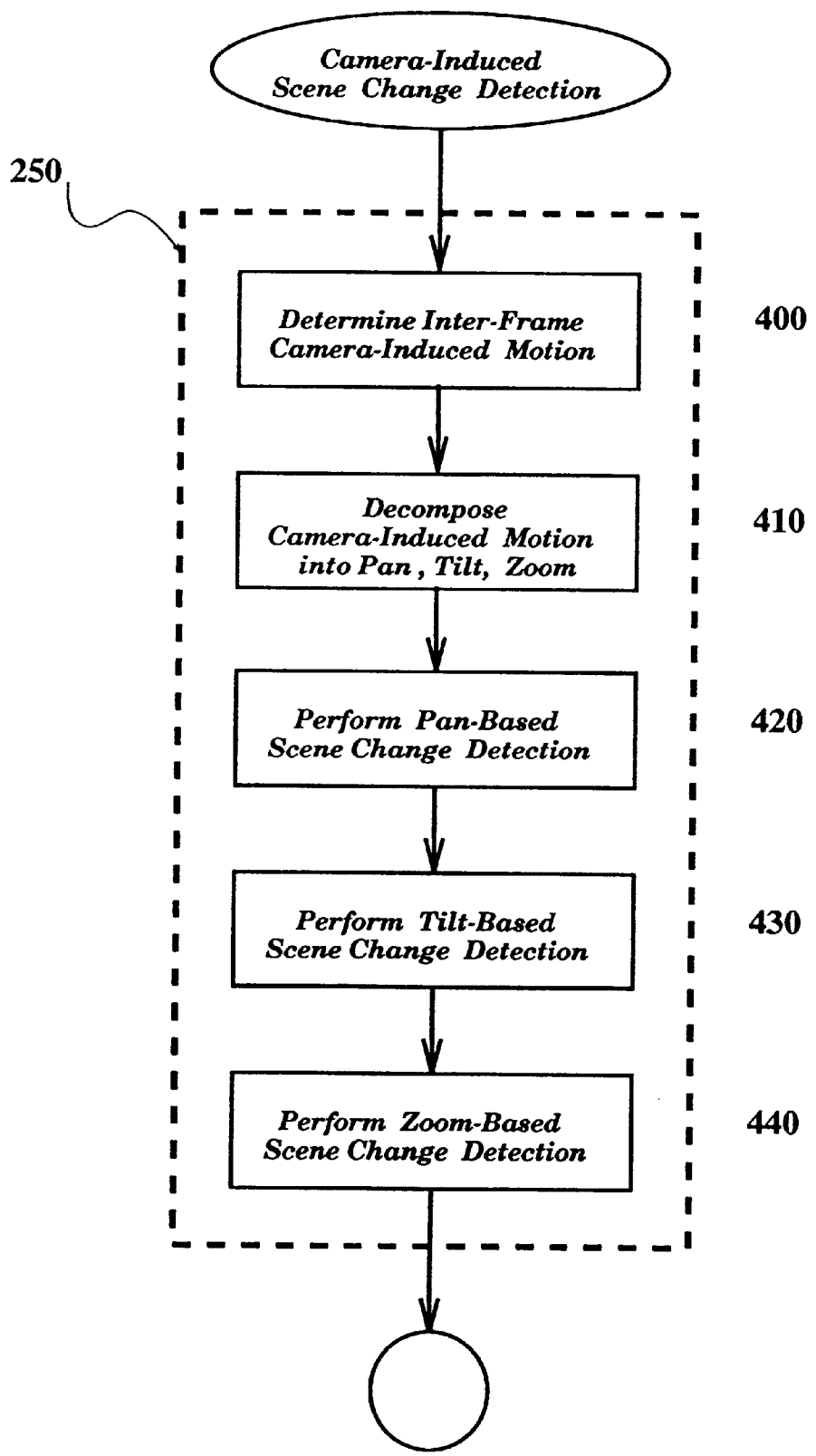
FIG. 4 is a flowchart illustrating an example of the detailed steps involved in the detection of camera-induced scene changes.

FIG. 4 is a flowchart showing an example of detailed steps that may be involved in the camera-induced scene change detection step 250. First, in step 400, the values of image pan, image tilt, and image zoom are determined using the current frame and the previous frame. This may also be done using a temporally down-sampled version of the video program. These values may be determined by block matching to find the motion vectors at a plurality of points in the image. The collection of motion vectors are further processed to discriminate between object motion and camera motion and to decompose the camera motion into pan, tilt and zoom components. Such procedures are known and disclosed in, for example, Umori K., et al., "Automatic Image Stabilizing System by Full-Digital Signal Processing," IEEE Transactions on Consumer Electronics, Vol. 36, No. 3, pp. 510–519, August 1990, Akutsu A., et al., "Video Indexing Using Motion Vectors," Proc. SPIE Conf. Visual Communications and Image Processing (VCIP' 92), Vol. 1818, pp. 1522–1530. Umori et al. relates to camera image stabilization and presents a real-time system for motion estimation, the discrimination between object motion and camera motion, and the measurement of image pan and image tilt. Akutsu et al. discloses a method for estimating camera operations using block matching and Hough transforms combined with shot detection to generate a new image icon representing the camera operation during a single shot. As noted previously, when camera motion involves dollying or tracking the different objects in the scene may move by differing amounts between consecutive frames. In such cases it is the motion of the most dominant object (in terms of the percentage of the total image that it occupies) which is of interest. This dominant motion can be determined by the above-mentioned methods.

In step 410, the camera-induced motion between the two frames is decomposed into image pan, image tilt, and image zoom components (if they were not already computed as separate components). The values computed for each of these components generate three discrete-time signals referred to as Instantaneous Pan (IP), Instantaneous Tilt (IT), and Instantaneous Zoom (IZ) respectively. The set of three instantaneous signals are used independently to generate two additional sets of signals in steps 420, 430, and 440. One set consists of three cumulative signals that each have values equal to the sum of the values of one of the three instantaneous signals starting with the value of the instantaneous signal at the beginning of the current scene. These signals are referred to as the Cumulative Pan (CP), Cumulative Tilt (CT), and Cumulative Zoom (CZ) signals, respectively. The second set of signals consists of three binary signals (i.e., signals each having only two values) each corresponding to one of the three components of the camera motion (i.e., pan, tilt and zoom). These signals are set to zero when the corresponding motion is not engaged (i.e., active), and are set to one when the motion is engaged. These signals are referred to as Pan Active (PA), Tilt Active (TA), and Zoom Active (ZA) signals, respectively. In some examples of the invention, additional steps may be taken when generating the PA, TA, and ZA signals to eliminate short inactive intervals that may fall between two active intervals so that the two active intervals are merged into one larger active interval.

The detection method of this invention may involve three independent steps that each correspond to one of the three components of camera motion. In FIG. 4 these steps are set forth as image pan 420, image tilt 430, and image zoom 440. The sub-steps involved in pan-based, tilt-based and zoom-based scene change detection are all substantially the same except that the threshold parameters may differ from one to the other. Accordingly, it is sufficient to discuss in more detail only the steps involving pan-based detection, pointing out any differences between it and the remaining two components.

Figure 5:
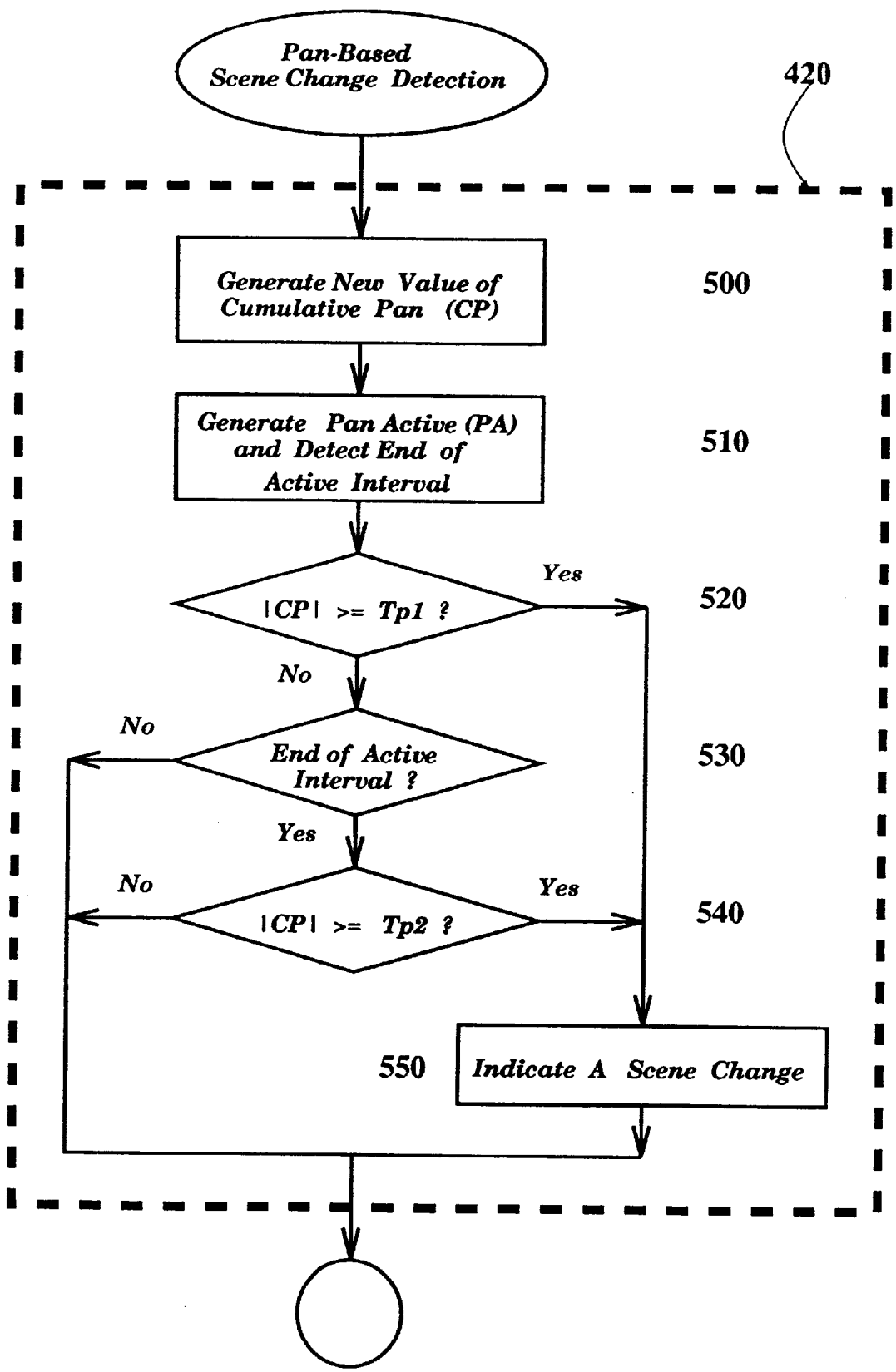
FIG. 5 is a flowchart illustrating an example of additional detailed steps involved in the detection of pan-based scene changes.

The details of the image pan step 420 of FIG. 4 are shown in greater detail in FIG. 5. First, a new value of the cumulative pan (CP) signal is generated in step 500 from its previous value by adding thereto the new value of the instantaneous pan signal. This cumulative value is initialized both at the start of the method and after a scene change has been detected in steps 210 and 310. It should be noted that the IP signal can assume both positive and negative numbers depending on the direction of pan. Accordingly, the CP signal may be either positive or negative and its magnitude may increase or decrease after the new IP value is added to it.

In step 510, the IP signal is used to generate a new value of the pan active (PA) signal. This signal has a value of zero during the intervals in which the pan operation is inactive and a value of one during active intervals. As noted above, additional steps may be performed to merge closely-spaced active intervals into single intervals and to detect the end of such intervals. The details of pan active step 510 are shown in FIG. 6 and will be discussed below.

In step 520 the magnitude of the CP signal is compared against a predetermined threshold Tp1. If the magnitude of the CP signal has reached or exceeded Tp1, a scene change belonging to the second category of camera motions is indicated. In this case the value of the PA signal is not used. The CP signal may have reached or exceeded the threshold as a result of one active pan interval or several discrete active intervals that occur during the current scene.

If a scene change belonging to the second category of camera motion has not been detected, the method in step 530 checks if the end of an active pan interval has been indicated by step 510. If so, the magnitude of the CP signal is compared against a predetermined threshold Tp2 in step 540. If the threshold has been reached or surpassed, a scene change belonging to the first category of camera motions is indicated. Step 540 is employed to prevent those active pan intervals having a negligible net result from registering a scene change. Examples of such negligible camera operations have been discussed above.

Figure 6:
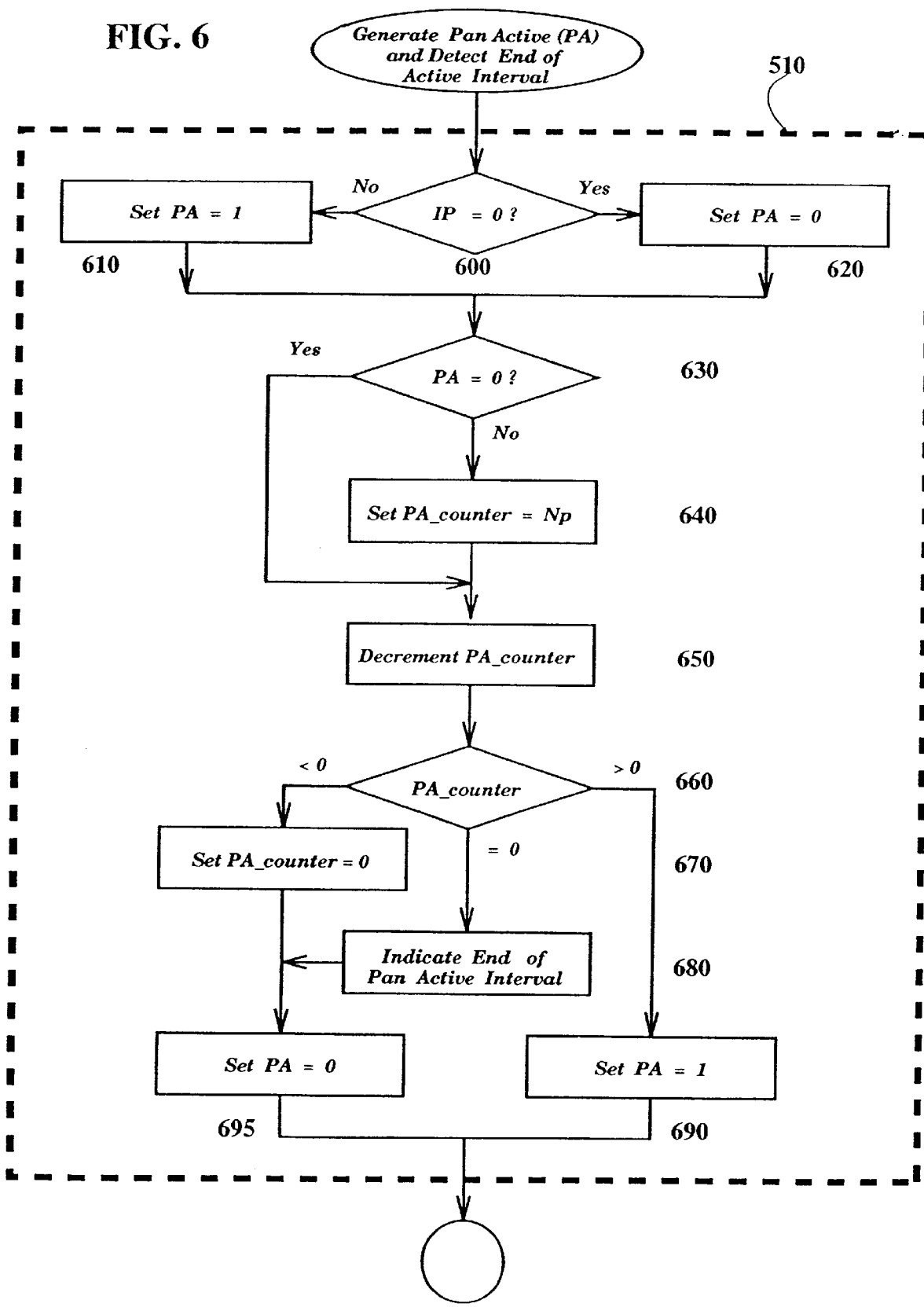
FIG. 6 is a flowchart illustrating detailed steps for generating a single pan active signal from closely-spaced active intervals.

FIG. 6 shows the details of pan active step 510. The current value of the IP signal is used to generate a new value for the PA signal in steps 600, 610, and 620. A non-zero value of the IP signal (positive or negative) indicates pan activity and will yield a value of one for the PA signal, whereas a value of zero for the IP signal will yield a PA value of zero. In some situations where noise or other factors may cause the IP signal to exhibit small non-zero values when the camera is not moving, step 600 may be modified to check the magnitude of the IP signal against a small non-zero value to determine the activity, or inactivity, of the pan operation.

Next, the PA signal is further processed to merge closely-spaced active intervals and to detect the end of such intervals. The new value of the PA signal is checked in step 630. If the PA signal is non-zero, a counter referred to as the PA_counter is set to a predetermined integer value Np (greater than one) in step 640. This counter is set to zero in steps 210 and 310. The value of Np determines the maximum size of the inactive region (i.e., PA=0) that is filled to merge two consecutive active regions. If the PA signal is zero, step 640 is not performed. The PA_counter is then decremented (by one) in step 650 and the result is checked in step 660. A positive counter value indicates that either the PA signal is currently set to one, or that it has been set to one at least once in the Np previous frame times. This results in setting the PA signal to one (if it were not already set to one in step 610), thus merging closely-spaced active intervals. A negative value of the PA_counter indicates that the counter was zero prior to step 650. This causes the counter to be set to zero again in step 670 and sets the PA signal equal to zero in step 695. A zero value for the counter in step 660 indicates that the counter had a value of one prior to step 660. This indicates the end of an active interval in step 680. At the completion of pan active step 510, a current (processed) value for the PA signal is generated and the end of an active pan interval is detected, if present.

Figure 7:
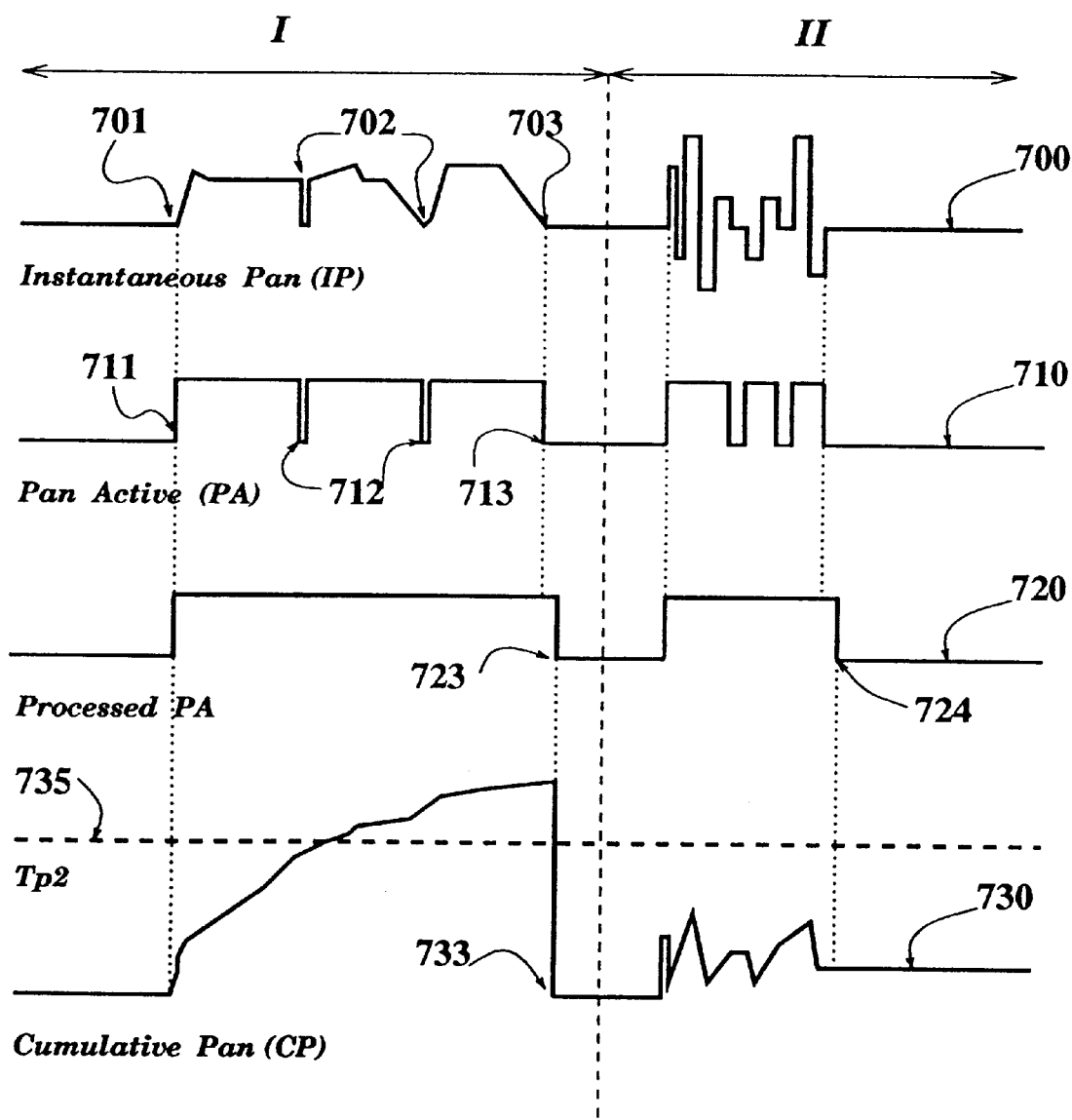
FIG. 7 shows, respectively, an example of a waveform for the image pan signal, the associated pan active signal before and after processing to merge closely-spaced active intervals, and the cumulative pan signal resulting is a scene change at the end of one active interval.

FIG. 7 shows examples of typical waveforms for the instantaneous pan signal and the signals derived therefrom in two different regions—denoted I (on the left) and II (on the right), each representing a different situation. Region I shows the IP signal 700 for a continuous pan operation that occurs in one direction. At two points 702 along the signal the IP signal goes to zero for a very short period of time. These points 702 are caused either by the absence of a good frame to process at these points or by the operation coming to a halt for a very short time before resuming. The associated PA signal 710 has two inactive intervals resulting from points 702. These inactive intervals have two transitions 712 from one to zero which are related to points 702, and an end of interval 713. By processing the PA signal to generate 720 the short inactive intervals have been eliminated. The end of the active pan interval 723 corresponds to the end of the interval 713 and is slightly shifted with respect to 713 due to processing. The CP signal 730, which has a value of zero at the beginning of the scene, is the sum of the IP values. At the end of the active pan interval 723, the CP signal 730 has exceeded the Tp2 threshold 735. This results in a scene change being indicated and the reinitialization of the detector which resets the CP signal (as well as other cumulative and active signals and counters) to zero at 733. The right side of FIG. 7 (region II) shows an IP signal 700 resulting from camera jitter (i.e., small, rapid motion to the left and right) which has negative and positive intervals. The processed PA signal 720 has a point 724 which corresponds to the end of the active pan interval. In this case, however, the CP signal, which has fluctuated due to the reversal of the direction of pan motion, has a value that falls below the Tp2 threshold 730, thus avoiding a false detection.

Figure 8:
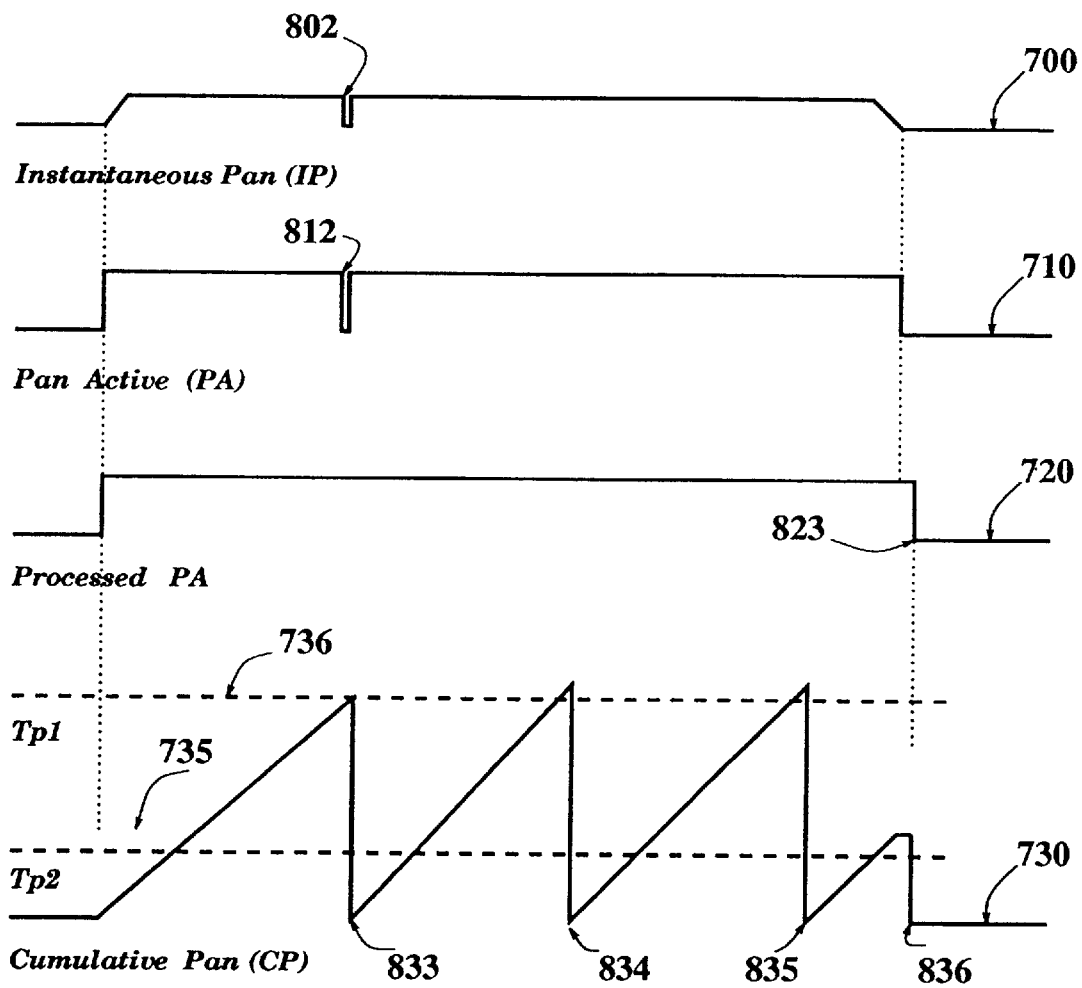
FIG. 8 shows, respectively, an example of the image pan signal during a sustained pan operation, the associated pan active signal before and after closely-spaced active intervals are merged, and the cumulative pan signal, all over the course of four scene changes, three of which occur during the active interval.

FIG. 8 shows an example of typical waveforms in a situation in which scene changes belonging to both the first and second category are detected. The IP signal 700 in this case shows a pan operation which is sustained for a long period of time. This is reflected in the processed PA signal 720, which exhibits a long active interval terminating at 823. The CP signal reaches the Tp1 threshold for the first time during the active period at the point denoted by 833. This results in a scene change (which falls in the second category). The CP signal is reset to zero at this point to start once again accumulating the IP values. The Tp1 threshold is reached for the second and third times at 834 and 835, respectively, resulting in two more scene changes being detected and the resetting of the CP signal to zero. Finally, at the end of the active interval 823, the CP signal has exceeded the Tp2 threshold, thus resulting in another scene change being detected at 836 which falls in the first category of camera motions.

Tilt-Based Scene Change Detection

Except for the difference in their direction of motion, tilt and pan are essentially the same. Accordingly, the pan-based and tilt based detection steps are substantially the same except that they may each have different thresholds. These steps are performed independently of one another.

Zoom-Based Scene Change Detection

The effects of camera zoom (or dolly) on the image are different from those of pan and tilt. The criteria established above for the two categories of inter-shot scene changes which were used to find pan-based and tilt-based scene changes apply equally to zoom. In the case of zoom, however, additional steps must be performed prior to the computation of the instantaneous zoom (IZ) and cumulative zoom (CZ) signals. The reason for this distinction is explained below.

Pan and tilt cause the image to undergo translational motion in the horizontal and vertical directions. This translational motion as measured between two frames is positive if the pan (or tilt) motion between the frames is in one direction and negative if it is in the opposite direction. Therefore, pan (or tilt) motions of equal magnitude but opposite directions which are performed over several frames will cancel each other out when computing the cumulative pan (or tilt) signals, thereby resulting in zero net motion since the beginning of the current scene. In other words, pan and tilt are additive components. Image zoom between two frames, however, is a multiplicative component. For example, consider three consecutive frames during a zoom operation. If the magnification of frame 2 is double that of frame 1, and the magnification of frame 3 is 1.25 times that of frame 2, the magnification of frame 3 with respect to frame 1 is equal to 2 multiplied by 1.25, which is 2.5. Accordingly, the method of this invention can be applied to the image zoom by setting each value of the instantaneous zoom signal (IZ) equal to the logarithm of the relative magnification between the present frame and the previous frame. This results in a value of zero for the IZ signal when the magnification remains the same (i.e., the relative magnification is equal to one, making the logarithm equal to zero). When the magnification increases (i.e., a magnification factor greater than one), the logarithm is positive, and when the magnification decreases, the logarithm is negative. Accordingly, the zoom active (ZA) and cumulative zoom (CZ) signals are computed in the same manner as for the pan-based motion discussed above except for requiring this additional step of computing the logarithm to generate the IZ signal.

The above discussion treats each of the pan, tilt, and zoom components of the camera-induced motion independently of one another. However, this does not preclude the application of the detection criteria set forth in this invention to some combination of these components. For example, the pan and tilt components may be combined to generate a motion vector and the magnitude of the resulting vector can be used in the detection method.

APPLICATIONS

It is known that shot boundary detection methods may be employed to generate indices for video programs. Such indices can be used to selectively retrieve individual shots from the video program. This invention provides a second level of indexing by generating indices for individual scenes within the shots. By providing both these levels of indices a more selective video information retrieval system is possible. Other applications of the method of this invention beyond indexing are also possible, some of which are discussed below.

A sequence of representative frames from the original sequence of frames can be generated by retaining a single frame from each of the scenes (as defined in terms of shot boundaries and scene boundaries within shots). This sequence contains those frames for which the contents of the original sequence (e.g., a video program) has undergone significant change. The temporal distance between consecutive representative frames is a function of the rate of change in the content of the frames in the original sequence which are interposed between the two consecutive representative frames. That is, more representative images are retained where the contents change rapidly, and fewer are retained where the contents change less rapidly. In signal processing terms, this situation can be viewed as a non-uniform resampling (or down-sampling) of the video program from a uniformly sampled source (e.g., the video program) having a large number of uniformly spaced samples (e.g., 30 frames for every second of NTSC video) to a much smaller number of samples. This small number of samples collectively contain most of the visual information contained in the original video program. Therefore, the set of representative images generated by the method of this invention can be considered a condensed version of the original video program. The set of static images obtained in this manner can be compressed using any of a number of image compression techniques (e.g., JPEG) to further reduce storage and transmission requirements.

In general, the criteria employed in deciding on the particular representative images to retain depends on the criteria used to determine what constitutes a change in the contents of a video segment and what type of changes are deemed to be significant. The particular criteria employed will differ depending on the reason for retaining representative frames. For example, while fine details such as changes in the facial expression of a person may be considered important in some applications, the detection of such changes may arguably involve a level of sophistication not feasible with a particular image technology. However, the criteria set forth by the method of this invention result in a well-defined and practical method for detecting a majority of contextual changes within a video program. While the information contained in these representative frames may not be complete by itself, when these frames are used, for example, as the visual component in multimedia data, the combination provides a rich source of information. The potential loss of some visual information as a result of the downsampling process will often be justified given the substantial reductions in storage and transmission requirements.

A number of illustrative applications of this invention involving multimedia videos programs will be discussed below. For example, the set of representative images obtained by this invention may be used, possibly in compressed form, in conjunction with audio and/or text (also in compressed form) to store a condensed multimedia program on a computer or workstation. Such a condensed version of the original program can be retrieved and presented on a computer, the representative frames appearing on the computer screen accompanied by the audio, which is transmitted through a speaker in proper synchronization with the frames. The representative frames stored on the computer may also be used as an index to fast-forward or rewind the program to any desired point. The digitally stored, compressed multimedia version of the video program may be readily accessed at a remote location by another workstation.

A condensed multimedia version of a live video program can be generated in real time for transmission to a remote location over a band-limited transmission line. This will provide a remote user with access to the live broadcast over a telephone line using a video-telephone or a computer capable of displaying static images and which can play audio.

Content-based resampling of video programs or video segments also may be applied to image databases and video databases. Image databases consist of a collection of frames or images on which content-based queries can be performed. To respond to queries by extracting information from the images often involves performing image processing and interpretation on a large segment of the images in the database. The high computational cost of image processing and interpretive operations imposes limits on the number of images that can be processed. Accordingly to perform such operations on a collection of video segments by processing every frame is prohibitive because of the large number of frames contained in a video segment. By using the content-based resampling method of this invention, each video segment can be reduced to a smaller number of images on which content-based queries can be more realistically performed.

What is claimed is:

1. A method of determining whether a scene change in a sequence of visual information-bearing frames comprising content is a shot boundary scene change at a shot boundary between two successive shots or a camera-induced motion scene change at a point within a shot where the content changes considerably as a result of camera-induced motion, said method comprising the steps of:

(a) responsive to a shot boundary between two successive shots, generating a shot boundary scene change indicator signal to indicate a scene change between the two successive shots;

(b) responsive to camera-induced motion within a particular shot of the two successive shots, generating a first signal representing camera-induced motion between each of a plurality of pairs of frames within said sequence of visual information-bearing frames within the particular shot;

(c) decomposing the camera-induced motion represented by the first signal for the plurality of pairs of frames into at least a first component signal;

(d) summing the values of the first component signal for each of the pairs of frames to form a first cumulative signal; and (e) generating a camera-induced motion scene change indicator signal to indicate a scene change within the particular shot of the successive shots when the first cumulative signal meets a predetermined decision criterion, wherein the particular shot comprises a plurality of consecutive frames generated during a continuous time interval by a single camera.

2. A method of determining whether a scene change in a sequence of visual information-bearing frames comprising content is a shot boundary scene change at a shot boundary between two successive shots or a camera-induced scene change at a point within a shot where the content changes considerably as a result of camera-induced motion, said method comprising the steps of:

(a) responsive to a shot boundary between two successive shots, generating a shot boundary scene change indicator signal;

(b) responsive to the occurrence of any camera-induced motion within a particular shot of the successive shots defined by the shot boundary, generating a signal representing the camera-induced motion between each of a plurality of pairs of frames within said sequence of visual information-bearing frames within the particular shot;

(c) decomposing the camera-induced motion represented by the first signal for the plurality of pairs of frames into components representing values of image pan, image tilt, and image zoom to form an image pan signal, an image tilt signal, and an image zoom signal, respectively;

(d) summing each of the image pan, image tilt, and image zoom signals to form a cumulative pan signal, a cumulative tilt signal, and a cumulative zoom signal, respectively; and (e) generating a camera-induced motion scene change indicator to indicate a scene change within one of the successive shots when at least one of the cumulative signals meet a predetermined decision criterion, wherein the particular shot comprises a plurality of consecutive frames generated during a continuous time interval by a single camera.

3. A method of determining camera-induced scene changes in a sequence of visual information-bearing frames comprising content, said method comprising the steps of:

(a) determining at least two camera shots within said visual information-bearing frames, each respective shot comprising a plurality of consecutive frames generated during a continuous time interval by a single camera; and for at least one of said camera shots, (b) generating a signal representing a considerable change in the content as a result of camera-induced motion between each of a plurality of pairs of frames within said at least one camera shot;

(c) summing a plurality of the signals generated for a respective plurality of pairs of frames to form a first cumulative signal; and (d) generating an indicator signal that indicates a camera-induced scene change when the first cumulative signal meets a predetermined decision criterion.

4. The method of claim 1 further comprising the steps of:

(f) repeating step (c) for second and third components of the camera-induced motion to form second and third component signals such that the first, second, and third components represent image pan, image tilt, and image zoom, respectively; and (g) repeating step (d) for the second and third components to respectively form second and third cumulative signals; and wherein step (e) comprises the step of generating a camera-induced motion scene change indicator signal when at least one of the first, second or third cumulative signals meet a predetermined decision criterion.

5. The method of claim 1 further comprising the steps of:

(f) generating at least a first active signal corresponding to the first component of camera-induced motion, said first active signal having first and second values that represent, respectively, the absence of camera-induced motion and the presence of camera-induced motion for the first component of camera-induced motion; and wherein the step of generating a camera-induced motion scene change indicator signal comprises the step of generating a camera-induced motion scene change indicator signal when the first active signal and the first cumulative signal each meet a certain decision criterion.

6. The method of claim 5 further comprising the steps of:

(g) repeating step (c) for second and third components of the camera-induced motion to form second and third component signals, such that the first, second, and third components represent image pan, image tilt, and image zoom, respectively;

(h) repeating step (d) for the second and third components to respectively form second and third cumulative signals;

(i) repeating step (f) to determine second and third active signals that correspond respectively to the second and third components of the camera motion; and wherein the step of generating a camera-induced motion scene change indicator signal comprises the steps of generating a camera-induced motion scene change indicator signal when at least one of the first, second or third active signals and the cumulative signal representing the same component of camera-induced motion as the at least one of the first, second, or third active signals each meet a predetermined decision criterion.

7. The method of claim 4, wherein the predetermined decision criteria comprise predetermined thresholds for each of the cumulative signals, said decision criteria being met when at least one of the first, second, or third cumulative signals has a magnitude at least as large as its corresponding predetermined threshold.

8. The method of claim 6, wherein the step of generating a camera-induced motion scene change indicator signal further comprises the step of:

generating a camera-induced motion scene change indicator signal after the end of an interval over which at least one of the active signals assumes its second value and the magnitude of the corresponding cumulative signal representing the same component of camera-induced motion as the at least one active signal at the end of an active interval is at least as large as a predetermined threshold.

9. The method of claim 2 further comprising the step of:

(f) generating an active signal for each of the image pan, image tilt, and image zoom components, each of said active signals having first and second values, the first value representing a component having a magnitude of zero and the second value representing a component having a magnitude that is non-zero; and wherein the step of generating a camera-induced motion scene change indicator signal comprises the step of generating a camera-induced motion scene change indicator signal when at least one of the active signals and the cumulative signal representing the same component of camera-induced motion as the at least one active signal each meet predetermined decision criteria.

10. The method of claim 2, wherein the predetermined decision criterion are met when the magnitude of at least one of the cumulative signals surpasses a predetermined threshold.

11. The method of claim 2, wherein predetermined decision criterion comprise predetermined thresholds for each of the cumulative signals, said decision criteria being met when at least one of the cumulative signals surpasses its corresponding predetermined threshold.

12. The method of claim 9, wherein the step of generating a camera-induced motion scene change indicator signal further comprises the step of:

generating a camera-induced motion scene change indicator signal after the end of an interval, over which at least one of the active signals assumes its second value and the magnitude of the corresponding cumulative signal representing the same component of camera-induced motion as the at least one active signal at the end of the active interval is at least as large as a predetermined threshold.

13. The method of claim 2, wherein the step of generating a first signal comprises the steps of:

(a) performing motion estimation between each of the pairs of frames; and (b) discriminating between camera-induced motion and object motion for each of the pairs of frames.

14. The method of claim 1, wherein the step of generating a camera-induced motion scene change indicator signal further comprises the step of retaining a frame from a scene defined by the indicated scene change.

15. A method of determining whether a scene change is a shot boundary scene change or a camera-induced motion scene change in a sequence of visual information-bearing frames, said method comprising the steps of:

(a) responsive to a shot boundary between two successive shots, generating a shot boundary scene change indicator signal to indicate a scene change between the two successive shots;

(b) responsive to camera-induced motion, generating a first signal representing camera-induced motion between each of a plurality of pairs of frames within said sequence of visual information-bearing frames;

(c) decomposing the camera-induced motion represented by the first signal for the plurality of pairs of frames into at least a first component signal;

(d) summing the values of the first component signal for each of the pairs of frames to form a first cumulative signal;

(e) generating a camera-induced motion scene change indicator signal to indicate a scene change within one of the successive shots when the first cumulative signal meets a predetermined decision criterion;

(f) repeating steps (b) through (e) until all camera-induced motion scene changes within the sequence of visual information-bearing frames have been indicated, wherein the step of summing the values of the first component signal to form the first cumulative signal comprises the step of summing only those values of the first component signal that have been determined since the immediately preceding camera-induced motion scene change; and (g) repeating steps (a)–(f) until all shot boundary scene changes and camera-induced motion scene changes within the sequence of visual information-bearing frames have been indicated.

16. The method of claim 15 further comprising the step of retaining a frame from each scene defined by the indicated scene changes.

17. The method of claim 15 further comprising the step of forming an index containing the location of a frame from each scene defined by the indicated scene changes.

18. The method of claim 17, wherein the retained frames form a set of representative frames that comprise a visual component of multimedia data.

19. The method of claim 5, further comprising the steps of:

(g) repeating step (c) for second and third components of the camera-induced motion to form second and third component signals, such that the first, second, and third components represent image pan, image tilt, and image zoom, respectively;

(h) repeating step (d) for a combination of the first, second, and third component signals to form a combined cumulative signal;

(i) repeating step (f) to generate a combined active signal that corresponds to the combined cumulative signal; and wherein the step of generating a camera-induced motion scene change indicator signal comprises the step of generating a camera-induced motion scene change indicator signal when the combined active signal and the combined cumulative signal each meet a predetermined decision criterion.

20. A method of determining whether a scene change is a shot boundary scene change or a camera-induced motion scene change in a sequence of visual information-bearing frames, said method comprising the steps of:

(a) responsive to a shot boundary between two successive shots, generating a shot boundary scene change indicator signal to indicate a scene change between the two successive shots;

(b) responsive to camera-induced motion, generating a first signal representing camera-induced motion between each of a plurality of pairs of frames within said sequence of visual information-bearing frames;

(c) decomposing the camera-induced motion represented by the first signal for the plurality of pairs of frames into at least a first component signal;

(d) summing the values of the first component signal for each of the pairs of frames to form a first cumulative signal;

(e) generating a camera-induced motion scene change indicator signal to indicate a scene change within one of the successive shots when the first cumulative signal meets a predetermined decision criterion;

(f) repeating step (a) until all shot boundary scene changes within the sequence of visual information-bearing frames have been indicated before proceeding to step (b).

21. A method of determining whether a scene change is a shot boundary scene change or a camera-induced motion scene change in a sequence of visual information-bearing frames, said method comprising the steps of:

(a) responsive to a shot boundary between two successive shots, generating a shot boundary scene change indicator signal to indicate a scene change between the two successive shots;

(b) responsive to camera-induced motion, generating a first signal representing camera-induced motion between each of a plurality of pairs of frames within said sequence of visual information-bearing frames;

(c) decomposing the camera-induced motion represented by the first signal for the plurality of pairs of frames into at least a first component signal;

(d) summing the values of the first component signal for each of the pairs of frames to form a first cumulative signal;

(e) generating a camera-induced motion scene change indicator signal to indicate a scene change within one of the successive shots when the first cumulative signal meets a predetermined decision criterion;

(f) repeating steps (b) through (e) until a plurality of camera-induced motion scene changes within the sequence of visual information-bearing frames have been indicated, wherein the step of summing the values of the first component signal to form the first cumulative signal comprises the step of summing only those values of the first component signal that have been determined since the immediately preceding camera-induced motion scene change; and (g) repeating steps (a)–(f) until a plurality of shot boundary scene changes and camera-induced motion scene changes within the sequence of visual information-bearing frames have been indicated.

22. A method of determining whether a scene change is a shot boundary scene change or a camera-induced motion scene change in a sequence of visual information-bearing frames, said method comprising the steps of:

(a) responsive to a shot boundary between two successive shots, generating a shot boundary scene change indicator signal to indicate a scene change between the two successive shots;

(b) responsive to camera-induced motion, generating a first signal representing camera-induced motion between each of a plurality of pairs of frames within said sequence of visual information-bearing frames;

(c) decomposing the camera-induced motion represented by the first signal for the plurality of pairs of frames into at least a first component signal;

(d) summing the values of the first component signal for each of the pairs of frames to form a first cumulative signal;

(e) generating a camera-induced motion scene change indicator signal to indicate a scene change within one of the successive shots when the first cumulative signal meets a predetermined decision criterion;

(f) repeating step (a) until a plurality of shot boundary scene changes within the sequence of visual information-bearing frames have been indicated before proceeding to step (b).

* * * * *